United States Patent Office 3,117,147
Patented Jan. 7, 1964

3,117,147
ORGANO-METAL CHELATES OF POLYAMINO POLYACETIC ACIDS
Horst G. Langer, Cochituate, Mass., assignor to The Dow Chemical Company, Midland, Mich., a corporation of Delaware
No Drawing. Filed Jan. 25, 1961, Ser. No. 84,773
10 Claims. (Cl. 260—429.7)

This invention relates to a new class of chemical compounds and to a method of their preparation, the compounds being characterized as organo metal salts of organo metal chelates of ethylene dinitrilo tetraacetic acid and polyamino polyacetic acids.

For many purposes it is essential to have certain metals in organic form wherein the metal can be made available for its biological activity. For example for many purposes metal chelates are useful biologically in that the chelated metal provides a reservoir of that metal ion for the physiological system into which it is passed, or it can be exchanged for another metal in the system and thus be useful, for example, in detoxification operations. In this connection reference may be had to United States Patent 2,698,823, Bersworth and Rubin. Quite often it is desirable that the metal chelate added to a biological system also carry additional organo groups which can contribute to its usefulness without impairing biological activity or possibly while enhancing the biological activity of the compound.

It is, accordingly, a fundamental object of this invention to provide organo tin compounds characterized by their being chelates of certain amino acids which chelates will also carry other organo metal groups rendering the compounds useful in organic systems.

It is another object of the invention to provide tetra substituted organo tin compounds carrying four functional groups any one of which may be modified to alter the properties of the tin compounds.

Other objects and advantages of the invention will in part be obvious and in part appear hereinafter.

This invention accordingly is embodied in a new kind of chemical compound which is a novel salt of fully substituted organo metal and may be characterized essentially as a salt of organo substituted metal formed with a chelating agent, wherein the chelating portion of the molecule is fully occupied by additional organo metal moiety. More specifically the structure of the composition may be shown in conventional fashion by the following representation:

$$(R)_o Me^1 : X[Me^2(R)_n]_m$$

wherein the R represents the organo constituents alike or different on the metal. $Me^1$ and $Me^2$ represent the metal which could be the same or different, $Me^1$ being chelates and $Me^2$ being a part of the salt; and X represents the chelating moiety of the molecule; $n$ is an integer which is large enough to satisfy the valence of $Me^2$; $m$ is an integer and is large enough to satisfy the X moiety; $o$ may be 0, as when $Me^1$ is divalent, but generally has a positive value which satisfies the valence of $Me^1$. More specifically these compounds may take the form of bis trivinyl tin salt of the diphenyl tin chelate of ethylene dinitrilo tetra acetic acid, which is represented by the following formula:

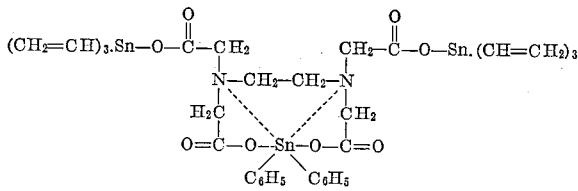

From the example it will be seen that the organo substitution of the tin, which is in the salt forming portion of molecule, may be an unsaturated group, such as a vinyl group, or further that the organo group of the tin atom may be a phenyl group, or it may be any other more or less reactive group. In the example given tin carries both, i.e., unsaturated moieties in one position, the other moieties in the other.

With a molecule of this structure it will be seen that functionality appears in several places and that it can take the form of unsaturation suitable for reaction with polymer forming materials, or for direct polymerization, and further the molecule can be used as the carrier of other groups.

The structure of the compounds leads to a number of advantages in that the points of variability introduce the possibility of making the compound very specific biologically, or very broadly active as an insecticide, bactericide, herbicide or parasiticide. The compound offers so many sites for the inclusion of chemical moieties and combinations of moieties that "tailor made" specific insecticides become possible.

Typical compounds which can be made in accordance with this invention are the following:

Bis (trivinyl tin) salt of the diphenyl tin chelate of EDTA
Bis (triphenyl tin) salt of the diphenyl tin chelate of EDTA
Bis (tributyl tin) salt of the diphenyl tin chelate of EDTA
Bis (trivinyl tin) salt of the diphenyl lead chelate of EDTA
Bis (trivinyl tin) salt of the tin (II) chelate of EDTA
Tin (II) salt of the divinyl tin chelate of EDTA The organo metal portions of the compound is best exemplified by organo tin salts which are readily available commercially as hydroxides, halides, acetates or bis organo oxides having at least the following in the structure

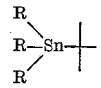

In these compounds the R group may be all alike or different.

Reference to the following specific examples will give an accurate indication of the manipulations involved in the formation of each compound.

*Example 1*

Bis-trivinyl tin salt of di-phenyl tin ethylenediaminetetraacetic acid.

1 millimole of bis-trivinyl tin EDTA and 1 millimole of di-phenyl tin dichloride are slightly heated in 100 milliliters of acetone. A few drops of water are added until the reactants are dissolved. By adding a large excess of water, the compound precipitates, is filtered off and air dried.

II: Two millimoles of trivinyl tin hydroxide are added to 1 millimole of divinyl tin EDTA (chelate) in 100 ml. of 60 ethanol in water. The reactants dissolve completely and after addition of excess ethanol the bis (trivinyl tin) salt of the divinyl tin chelate of EDTA precipitates. The crystals are filtered off and dried by suction.

III: One millimole of stannous chloride dissolved in a small volume of ethanol is added slowly to one millimole of the divinyl tin (IV) chelate of EDTA in approximately 100 ml. water. The pH is kept between 5 and 7 by addition of sodium hydroxide. The reactants dissolve completely and the tin (II) salt of the divinyl tin (IV) chelate of EDTA is precipitated through addition of ethanol.

IV: Substitution in Example III of the bis (trivinyl tin (IV)) salt of EDTA for the divinyl tin (IV) chelate of EDTA results in formation of the bis (trivinyl tin (IV)) salt of the mono tin (II) chelate of EDTA.

The equations summarizing the preferred ways of making the compounds as follows:

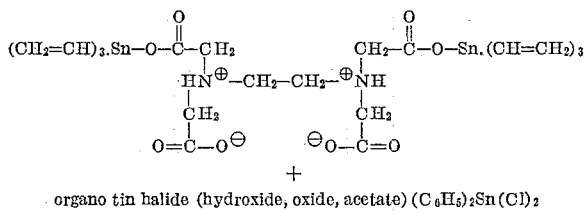

organo tin halide (hydroxide, oxide, acetate) $(C_6H_5)_2Sn(Cl)_2$ or

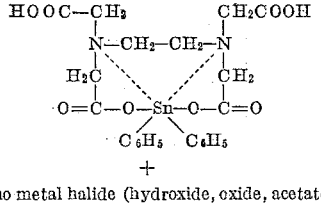

organo metal halide (hydroxide, oxide, acetate)

Referring back to the general formula and the specific formulas for the trivinyl tin salt used as starting material in Example I it is, of course, evident from the structure that the raw materials necessary for the formation are, at least, the essential chelating agent, which in this instance was ethylenediaminetetraacetic acid and a trivinyl tin compound. Specifically, to form the trivinyl tin salt portion of a molecule it is most advantageous to have as raw materials the corresponding tin hydroxide. Thus tin hydroxide, with the tin in the tetra valent form, the remaining 3 valences of the tin being satisfied by whatever organo group is to be carried by the compound, is the basic material used to react with ethylenediaminetetraacetic acid. When this compound is reacted in an appropriate stoichiometric amount, namely, 2 moles of tin for each mole of ethylenediaminetetraacetic acid, the monofunctional tin is attached to two acid groups of the ethylenediaminetetraacetic acid. To have it carry more than two tin atoms, it is reacted further with tri-organo tin hydroxide to a maximum extent of 4 moles per mole of ethylenediaminetetraacetic acid. This sequence of compounds is described in my copending application filed contemporaneously herewith.

When this di-tin salt is reacted with diphenyl tin dichloride (or other di-organo tin di-halide, or other organo metal di-halides, di-hydroxides), hydrogen chloride or H₂O is removed from the sphere of the reaction and the bis trivinyl tin salt of diphenyl tin ethylenediaminetetraacetic acid is formed. If it is desired to have other groups than the phenyl groups attached in this reaction the corresponding dialkyl tin compound or other organo metal compound, is used as a starting material.

Thus the organo groups attached to the tin atoms in the compound, as described generally herein, may be any alkyl or aryl organic groups even where those groups carry certain common substituents such as halogens, and are substituted with a hydroxyl or ether groups. Similarly where I have used tin as illustrating the reactions specifically, any metal having the corresponding level of reactivity with organic moieties is useful for the purposes. For example, the other metals of groups 4A, 5A, 2b of periodic classification of elements may be used, namely, lead, germanium, arsenic, antimony and mercury, in its divalent form, etc.

Since it is reaction of these materials with a chelating agent which is described, it is apparent that the chelating portion of the reaction mixture may be an ethylenediaminetetraacetic acid as the type compound but it is also clear that the chelating agent may have a formula corresponding to the following:

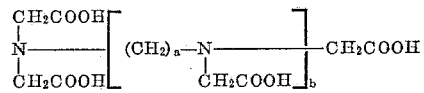

wherein a represents an integer having a value of 2, 3 or 4, and b represents an integer having a value of 1, 2, 3 or 4.

Typical chelating agents useful in the formation of this type compound are:

(1) Ethylene diamine tetra acetic acid.
(2) β-Hydroxyethyl ethylene diamine triacetic acid.
(3) Di ethylene triamine pentaacetic acid.
(4) Tri ethylene tetraamine hexaacetic acid (the β-hydroxyethyl variants of 3 and 4 when the β-hydroxyl group replaces an acid moiety).
(5) In compounds of this general class the alkyl group between the nitrogen atoms may be 2, 3 or 4 carbon group or the number of nitrogens and groups may be increased so that the compound can become a polyamine polyacetic acid. Also the acid groups may be replaced by β-hydroxy groups, i.e., β-hydroxyethyl, to the extent of one per nitrogen atom.

Inasmuch as the materials used are inherently reactive, temperature at which the reaction is carried out may be in the range which will keep the materials in their liquid phase, i.e. solutions. Since the reaction is carried out in water, temperature from approximately ambient to approaching 100° C. are suitable; as is true of most reactions of this character elevated temperature causes the reaction to go more quickly.

The compounds formed in accordance with the invention are colorless crystal solid, non-hygroscopic compounds which may be reduced to fine degrees of subdivision and have considerable value as fungicides, slimicides, bactericides and insecticides. Testing indicates complete activity against the southern armyworm in concentrations of 50 parts per million and spotted spider-mites in concentrations of 500 parts per million.

What is claimed is:

1. A compound having a formula given by the following:

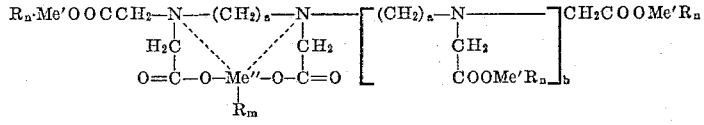

wherein $a$ represents an integer having a value in the range 2, 3, 4, and $b$ represents an integer having a value in the range 0, 1, 2, 3; R moieties are selected from the group consisting of lower alkyl and phenyl moieties; Me′ and Me″ are selected from the group consisting of metal atoms from groups 4A, 5A, and 2B of the periodic classification, which are at least bivalent and may be the same; $n$ has a value one less than the valence of Me′; $m$ is an integer two less than the valence of Me″; Me″(R)$_m$ being the chelated metal portion of the molecule.

2. The bis (trivinyl tin) salt of the diphenyl tin chelate of ethylenediaminetetraacetic acid.

3. The bis (triphenyl tin) salt of the diphenyl tin chelate of ethylenediaminetetraacetic acid.

4. The bis (tributyl tin) salt of the diphenyl tin chelate of ethylenediaminetetraacetic acid.

5. The bis (trivinyl tin) salt of the diphenyl lead chelate of ethylenediaminetetraacetic acid.

6. The bis (trivinyl tin) salt of the tin (II) chelate of ethylenediaminetetraacetic acid.

7. The tin (II) salt of the divinyl tin chelate of ethylenediaminetetraacetic acid.

8. The method of forming the tin (II) salt of the divinyl tin (IV) chelate of ethylene dinitrilo tetraacetic acid which comprises reacting ethylene dinitrilo tetraacetic acid with divinyl tin (IV) oxide to form the divinyl tin (IV) chelate of ethylene dinitrilo tetraacetic acid and thereafter reacting said chelate with stannous chloride to form the tin (II) salt of the divinyl tin (IV) chelate of ethylene dinitrilo tetraacetic acid.

9. The method of forming the bis (trivinyl tin (IV)) salt of the mono tin (II) chelate of ethylene dinitrilo tetraacetic acid which comprises reacting ethylene dinitrilo tetraacetic acid with trivinyl tin (IV) hydroxide to form the bis (trivinyl tin (IV)) salt of ethylene dinitrilo tetraacetic acid and thereafter reacting said salt with bi-functional stannous chloride to form the bis (trivinyl tin (IV)) salt of the mono tin (II) chelate of ethylene dinitrilo tetraacetic acid.

10. The method of forming bis (trivinyl tin) salt of the divinyl tin chelate of ethylenediaminetetraacetic acid which comprises reacting trivinyl tin hydroxide with divinyl tin chelate of ethylenediaminetetraacetic acid to form the bis (trivinyl tin) salt of the divinyl tin chelate of ethylenediaminetetraacetic acid.

References Cited in the file of this patent

UNITED STATES PATENTS

| | | |
|---|---|---|
| 2,859,104 | Kroll | Nov. 4, 1958 |
| 2,965,661 | Ramsden | Dec. 20, 1960 |
| 2,997,496 | Doerfelt et al. | Aug. 22, 1961 |
| 3,016,369 | Montermosco et al. | Jan. 9, 1962 |

FOREIGN PATENTS

| | | |
|---|---|---|
| 791,119 | Great Britain | Feb. 26, 1958 |

OTHER REFERENCES

Martell, "Chemistry of the Metal Chelate Compounds," Prentice-Hall, Inc. (1952), pages 516, 536 to 542, and 598.